No. 847,693. PATENTED MAR. 19, 1907.
H. E. REEVES.
DUST PAN.
APPLICATION FILED MAR. 19, 1906.
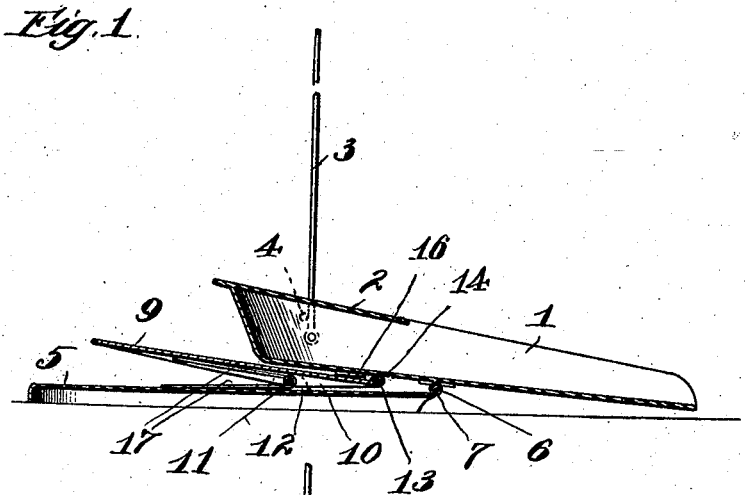
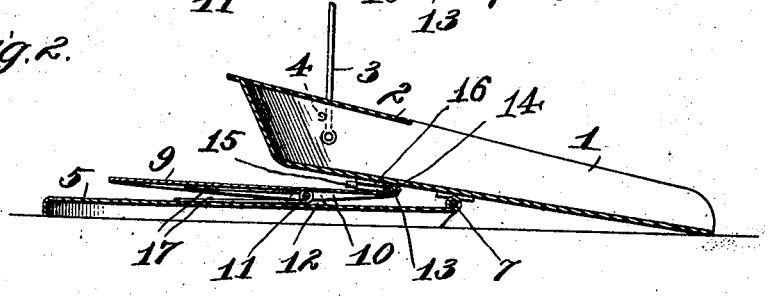
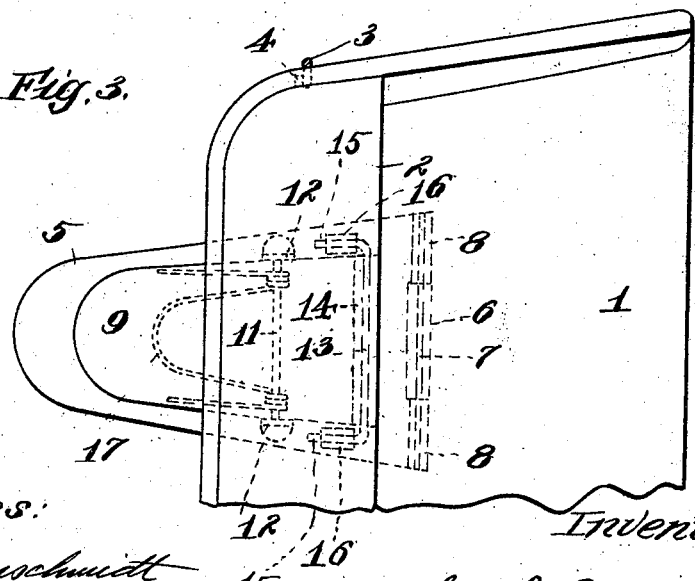
Witnesses:
G. A. Vauberschmidt
George L. Chindahl
Inventor
Harry E. Reeves
By Luther L. Miller
Atty

UNITED STATES PATENT OFFICE.

HARRY E. REEVES, OF CHICAGO, ILLINOIS.

DUST-PAN.

No. 847,693.   Specification of Letters Patent.   Patented March 19, 1907.

Application filed March 19, 1906. Serial No. 306,749.

*To all whom it may concern:*

Be it known that I, HARRY E. REEVES, a citizen of the United States, residing at Chicago, in the county of Cook and State of Illinois, have invented certain new and useful Improvements in Dust-Pans, of which the following is a specification.

In using the ordinary dust-pan it is necessary for the user to stoop and hold the pan in position with one hand while sweeping the dust into the pan with the broom held in the other hand.

The object of this invention, generally stated, is to provide a dust-pan which need not be manually held in position, thereby permitting the sweeper to stand erect and leaving both hands free to use the broom.

Other objects of the invention will appear in the following detailed description.

In the accompanying drawings, Figure 1 is a vertical longitudinal central section through a dust-pan embodying the features of my invention. In this figure the pan is shown in inoperative position. Fig. 2 is a view similar to that of Fig. 1, but showing the pan in the operative position. Fig. 3 is a fragmental top plan view of said dust-pan.

The embodiment herein shown of my invention comprises a pan 1, substantially like the ordinary dust-pan and provided with a partial cover or hood 2, extending across the rear end of the pan. The pan 1 is also, preferably, provided with a carrying-bail 3, pivotally connected with the sides of said pan near the rear end thereof. Stop-pins 4, projecting from the pan-body, limit the pivotal movement between the bail 3 and the pan 1 in one direction.

The pan 1 is herein shown as supported upon a base 5. In this instance said base is made of sheet metal and is provided at its forward end with a bearing-sleeve 6, formed integral with the body of the base. The pan 1 is pivotally connected with said base by means of a pintle 7, extending through the bearing-sleeve 6 and through two bearings 8, secured upon the under side of the pan 1 near the middle of said pan. In the embodiment herein shown the pan normally stands with its forward or receiving end out of contact with the floor. For pressing the forward edge of the pan 1 into firm contact with the floor I provide a foot-lever 9, formed in this instance from sheet metal and having side webs or flanges 10 to lend rigidity to the lever. Said lever is pivotally mounted upon a pivot-pin 11, extending through bearing-openings in said side flanges and through perforated bearing-ears 12, struck up from the metal of the base 5. The rear end of the foot-lever 9 extends beyond the rear end of the pan 1, and its forward end is suitably connected with said pan for tilting it. In the present construction said connection is formed by means of a pin 13, rotatably supported within a sleeve 14, formed at the forward end of said foot-lever. The ends of said pin are bent to provide two arms 15, extending at right angles to the body of the pin, said arms 15 being slidably mounted within bearings 16, secured to the under side of the pan 1. A spring 17, coiled about the pivot-pin 11, its ends lying between and bearing upon the base 5 and the foot-lever 9, tends to raise the rear end of said foot-lever and tilt the pan 1 upon its pivot 7.

In use the dust-pan is placed upon the floor at the point where it is desired to remove the sweepings. The operator places her foot upon the projecting rear end of the foot-lever 9, thereby tilting said lever and pressing the forward edge of the pan 1 firmly against the floor. The operator, standing erect, may now sweep the dust into the pan, both hands being free to use the broom. Upon removing her foot from the foot-lever 9 the spring 17 throws the rear end of said lever upward and raises the forward end of the pan from the floor. As the dust-pan may be picked up and set down by means of the bail 3, the amount of stooping required of the user is reduced to a minimum. It will be noted that the foot-lever 9 and the pan 1 are slidably connected, the pin 13 being slidably mounted in the bearings 16 in order that said pin may be free to move as the angle between the forward end of the foot-lever 9 and the base 5 is changed. Being of sheet metal, and therefore somewhat flexible, the parts of the device are adapted to yield slightly when pressure is placed upon them.

I claim as my invention—

1. In a dust-pan, in combination, a base; a pan pivotally mounted upon said base; and a foot-lever pivotally mounted intermediate its ends upon said base for pivotally moving said pan, one end of said lever being operatively connected with said pan, and the other end of said lever being adapted to receive the foot of the operator.

2. In a dust-pan, in combination, a base; a pan pivotally mounted on said base; and a foot-lever pivotally mounted between its ends upon said base and having a sliding connection at one end with said pan.

3. In a dust-pan, in combination, a base; a pan pivotally mounted on said base; a foot-lever pivotally mounted on said base; a pin attached to said foot-lever, the end portions of said pin extending at a right angle to the body of said pin; and bearings on said pan adapted to slidably support said angular ends of said pin.

4. In a dust-pan, in combination, a base; a pan pivotally connected near its middle portion with the forward portion of said base, said base extending rearwardly beyond the rear end of said pan; a foot-lever pivotally mounted upon said base between its ends; the forward end of said foot-lever having a sliding engagement with said pan, the rear end of said lever extending beyond the rear end of said pan; and a spring normally retaining said foot-lever in operative position.

HARRY E. REEVES.

Witnesses:
L. L. MILLER,
GEORGE L. CHINDAHL.